(12) United States Patent
Fehrsen

(10) Patent No.: US 6,951,043 B1
(45) Date of Patent: Oct. 4, 2005

(54) WINDSCREEN WIPER

(75) Inventor: Johannes Hendrik Fehrsen, Johannesburg (ZA)

(73) Assignee: TRICO Products Corporation, Rochester Hills, MI (US)

( * ) Notice: Subject to any disclaimer, the term of this patent is extended or adjusted under 35 U.S.C. 154(b) by 0 days.

(21) Appl. No.: 09/806,920

(22) PCT Filed: Sep. 22, 1999

(86) PCT No.: PCT/IB99/01565

§ 371 (c)(1), (2), (4) Date: Jun. 25, 2001

(87) PCT Pub. No.: WO00/21808

PCT Pub. Date: Apr. 20, 2000

(30) Foreign Application Priority Data

Oct. 12, 1998 (ZA) .................................. 98/9281

(51) Int. Cl.$^7$ ................................................ B60S 1/38
(52) U.S. Cl. ............................ 15/250.43; 15/250.451
(58) Field of Search ....................... 15/250.43, 250.44, 15/250.451, 250.452, 250.453, 250.454, 15/250.48, 250.361, 250.38, 250.4, 250.41

(56) References Cited

U.S. PATENT DOCUMENTS

| 2,589,339 A | 3/1952 | Carson ..................... 15/245 |
| 2,801,436 A | 8/1957 | Scinta ..................... 15/245 |
| 3,029,460 A | 4/1962 | Hoyler ................... 15/250.452 |
| 3,104,412 A | 9/1963 | Hinder ................... 15/250.42 |
| 3,116,510 A * | 1/1964 | Oishei et al. ............ 15/250.201 |
| 3,132,367 A | 5/1964 | Wise ..................... 15/250.42 |
| 3,139,644 A * | 7/1964 | Smith ..................... 15/250.3 |
| 3,192,551 A | 7/1965 | Appel ..................... 15/250.36 |
| 3,480,986 A | 12/1969 | Forster .................... 15/250.36 |
| 3,588,942 A | 6/1971 | Schlesinger ............... 15/250.32 |
| 3,751,754 A | 8/1973 | Quinian et al. ........... 15/250.32 |
| 3,780,395 A | 12/1973 | Quinian et al. ........... 15/250.36 |
| 3,785,002 A | 1/1974 | Quinlan et al. ........... 15/250.36 |
| 3,872,537 A | 3/1975 | Bianchi .................... 15/250.42 |
| 3,881,213 A * | 5/1975 | Tilli ....................... 15/250.43 |
| 3,881,214 A | 5/1975 | Palu ....................... 15/250.42 |
| 3,995,347 A * | 12/1976 | Kohler ..................... 15/250.43 |
| 4,028,770 A | 6/1977 | Appel ..................... 15/250.42 |
| 4,047,480 A * | 9/1977 | Vassiliou .................. 101/123 |
| 4,063,328 A | 12/1977 | Arman ..................... 15/250.42 |
| 4,102,003 A | 7/1978 | Hancu ..................... 15/250.42 |
| 4,127,916 A | 12/1978 | van den Berg et al. .. 15/250.42 |
| 4,339,839 A | 7/1982 | Knights ................... 15/250.04 |
| 4,343,063 A | 8/1982 | Batt ....................... 15/260.42 |
| 4,587,686 A | 5/1986 | Thompson ................ 15/250.42 |
| 4,807,326 A | 2/1989 | Arai et al. ............... 15/250.42 |
| 5,325,564 A | 7/1994 | Swanepoel ................ 15/250.42 |
| 5,485,650 A | 1/1996 | Swanepoel ................ 15/250.43 |
| 5,732,437 A * | 3/1998 | Jonasson et al. ......... 15/250.201 |

FOREIGN PATENT DOCUMENTS

| DE | 2309063 | * | 8/1974 | ............ 15/250.454 |
| DE | 2 311 293 | | 9/1974 | |
| DE | 23 50 302 | | 4/1975 | |
| DE | 2350302 | * | 4/1975 | ............. 15/250.43 |

(Continued)

Primary Examiner—Gary K. Graham
(74) Attorney, Agent, or Firm—Bliss McGlynn, P.C.

(57) ABSTRACT

The present invention relates to a windscreen wiper that includes a unitary elongate curved beam and a rubber blade mounted to the beam. The beam has a protective end formation located at at least one of its tips. The end formation comprises a deformed end portion of the beam which projects beyond the end portion of the rubber blade.

6 Claims, 1 Drawing Sheet

FOREIGN PATENT DOCUMENTS

| | | |
|---|---|---|
| DE | 23 36 271 | 6/1975 |
| DE | 23 53 368 | 7/1975 |
| DE | 197 34 843 A1 | 2/1999 |
| DE | 198 14 609 A1 | 10/1999 |
| FR | 82 14233 | 8/1982 |
| GB | 1 012 902 | 8/1965 |
| GB | 1 395 918 | 5/1975 |
| GB | 2 308 542 A | 7/1997 |

* cited by examiner

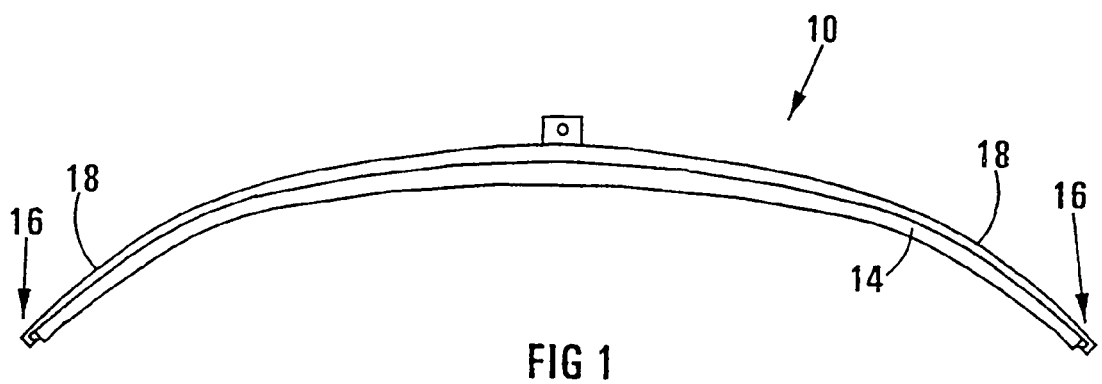
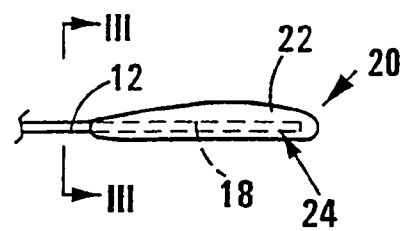
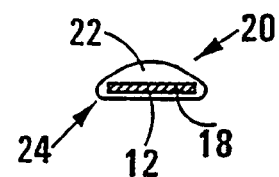
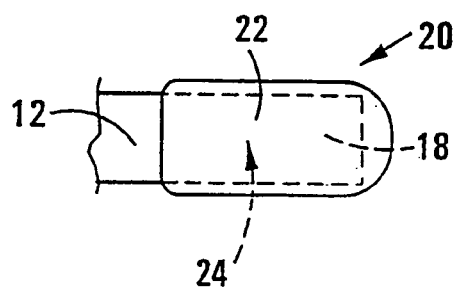
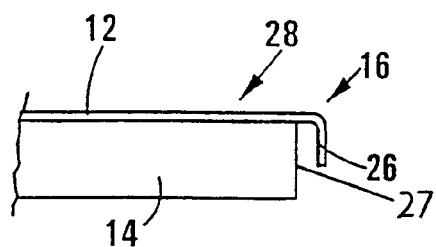
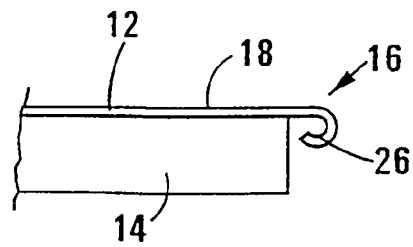

WINDSCREEN WIPER

BACKGROUND OF THE INVENTION

This invention relates to a windscreen wiper. More particularly, the invention relates to a windscreen wiper and to a protective end fitting for a windscreen wiper.

According to a first aspect of the invention, there is provided a windscreen wiper which includes a unitary elongate curved beam, the beam having a protective end formation at at least one of its tips. The beam may have a pair of end formations, one at each tip. Each of the end formations may include an extra length of the beam, with the beam mounted to a rubber so that the extra length projects beyond an end of the rubber.

Each of the extra lengths may be folded so that an end portion thereof extends substantially parallel to an end surface of the rubber. Alternatively, each of the extra lengths may be folded back on itself.

An edge portion of the length may be pre-shaped, having rounded edges. The extra length may be folded after being softened in a heating process to facilitate bending.

Each of the protective end formations may include a cap of a synthetic plastics material which fits over the tip.

The curved backbone may have a varying width and or thickness, along its length. The backbone may have a free form curvature in a plane or may have a compound curvature (that is curved in two planes).

According to a second aspect of the invention, there is provided a protective end fitting for a windscreen wiper, which includes a body member having a recess for snugly receiving a tip of a beam.

The fitting may have a locating means, with the beam having complementary locating formations for securing the fitting in position on the beam.

BRIEF DESCRIPTION OF THE DRAWINGS

The invention is now described, by way of example, with reference to the accompanying drawings, in which:

FIG. 1 shows a side view of a windscreen wiper, in accordance with a first aspect of the invention;

FIG. 2 shows a side view of a protective end fitting for a windscreen wiper, in accordance with a second aspect of the invention;

FIG. 3 shows an end view of the fitting of FIG. 2, viewed from a section taken along III—III in FIG. 2;

FIG. 4 shows a top view of the fitting of FIG. 2;

FIG. 5 shows a side view of one embodiment of a protective end formation for a windscreen wiper, in accordance with the first aspect of the invention; and FIG. 6 shows a side view of another embodiment of a protective end formation for a windscreen wiper, in accordance with the first aspect of the invention.

BRIEF DESCRIPTION OF THE PREFERRED EMBODIMENTS

In the drawings, a windscreen wiper in accordance with the invention is generally designated by the reference numeral 10. The windscreen wiper 10 includes a unitary curved backbone in the form of a beam 12 and a rubber wiper blade 14 in planar contact therewith. The beam 12 has a protective end formation generally indicated by reference numeral 16, at each of its tips 18.

Referring to FIGS. 2 to 4 of the drawings, a protective end fitting for a windscreen wiper, in accordance with a second aspect of the invention, is generally indicated by reference numeral 20. The protective end fitting 20 includes a body member 22 having a recess 24 for snugly receiving one of the tips 18 of the beam 12. Each fitting 20 is moulded and comprises a synthetic plastics material.

Referring now to FIGS. 5 and 6 of the drawings, two different embodiments of the protective end formation 16 are shown. In FIG. 5, the end formation 16 is in the form of a rounded end which was formed by folding an edge portion 26 of the tip 18 over, so that it extends substantially parallel to an edge 27 of the rubber. A gap is defined between the end portion of the rubber blade and the deformed end portion. An axis extending perpendicularly from the end portion of the rubber blade passes through the gap and the deformed end portion. The end formation 16, shown in FIG. 6, is also in the form of a rounded end formed by folding the edge portion 26 of the tip 18 over on itself.

Each edge portion 26 of the tip 18 comprises an extra length of the beam 12. The edge portion 26 may be bent by clamping the tip 18 of the beam 12 in a clamping mechanism to avoid bending or damaging of the beam 12 during bending of the edge portion 26. The edge portion 26 may be softened in a heating process before or after clamping of the tip 18 to facilitate bending.

It will be appreciated that the actual shape of the rounded end is cost and aesthetically determined.

What is claimed is:

1. A windscreen wiper (10) for a windscreen comprising a unitary elongate curved beam (12) with a top side facing away from the windscreen and a bottom side facing toward the windscreen, and a rubber blade (14) mounted to the beam (12) such that a top side of the rubber blade (14) is in planar abutment against the bottom side of the beam (12), the beam (12) having a protective end formation (16) at at least one of its tips (18), characterised therein that the curved beam (12) has a varying thickness and that the end formation (16) comprises a deformed end portion of the beam (12), which projects beyond and is spaced from an end portion of the rubber blade (14) to define a gap between the end portion of the rubber blade and the deformed end portion wherein an axis extending perpendicularly from the end portion of the rubber blade passes through the gap and the deformed end portion.

2. The windscreen wiper (10) as claimed in claim 1, characterised therein that the beam (12) has a pair of end formations (16), one at each tip (18).

3. The windscreen wiper (10) as claimed in claim 2, characterised therein that each end portion is folded over.

4. The windscreen wiper (10) as claimed in claim 1, characterised therein that the beam (12) has a free form curvature in a plane.

5. The windscreen wiper (10) as claimed in claim 1, characterised therein that the beam (12) has a compound curvature.

6. The windscreen wiper (10) as claimed in claim 1, characterized therein that the rubber blade (14) is mounted directly to a bottom side of the beam (12).

* * * * *